(12) United States Patent
Margalit et al.

(10) Patent No.: US 10,204,270 B2
(45) Date of Patent: Feb. 12, 2019

(54) METHOD AND SYSTEM FOR CROP YIELD ESTIMATION

(71) Applicant: FRUITSPEC LTD., Tel-Aviv (IL)

(72) Inventors: Nir Margalit, Ein Vered (IL); Shahar Nitsan, Ein Vered (IL); Raviv Kula, Modi'in (IL)

(73) Assignee: FRUITSPEC LTD, Tel-Aviv (IL)

( * ) Notice: Subject to any disclaimer, the term of this patent is extended or adjusted under 35 U.S.C. 154(b) by 147 days.

(21) Appl. No.: 15/353,754

(22) Filed: Nov. 17, 2016

(65) Prior Publication Data
US 2018/0137357 A1    May 17, 2018

(51) Int. Cl.
*G06K 9/00* (2006.01)

(52) U.S. Cl.
CPC .................. *G06K 9/00657* (2013.01)

(58) Field of Classification Search
CPC .................................................. G06K 9/00657
See application file for complete search history.

(56) References Cited

U.S. PATENT DOCUMENTS

2015/0015697 A1*  1/2015  Redden .............. G01N 33/0098
                                                       348/89

OTHER PUBLICATIONS

Feyaerts, Filip, and Luc Van Gool. "Multi-spectral vision system for weed detection." Pattern Recognition Letters 22.6-7 (2001): 667-674. (Year: 2001).*

* cited by examiner

*Primary Examiner* — Nirav G Patel
(74) *Attorney, Agent, or Firm* — The Roy Gross Law Firm, LLC; Roy Gross

(57) ABSTRACT

A method for identifying the presence of fruit in image data in an image sensor of a scene includes acquiring image data in an image sensor for at least two distinct wavelengths of a scene. A normalized difference reflectivity index (NDRI) for each location in an array of locations in the image data is calculated with respect to said at least two distinct wavelengths. Regions in the array of locations are identified where the value of the calculated NDRI of the locations in these regions is within a range of values indicative of a presence of fruits in the scene. An output is generated on an output device with information related to the identified presence of fruits.

19 Claims, 5 Drawing Sheets

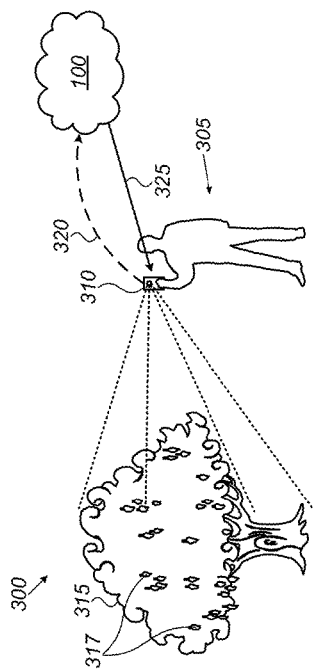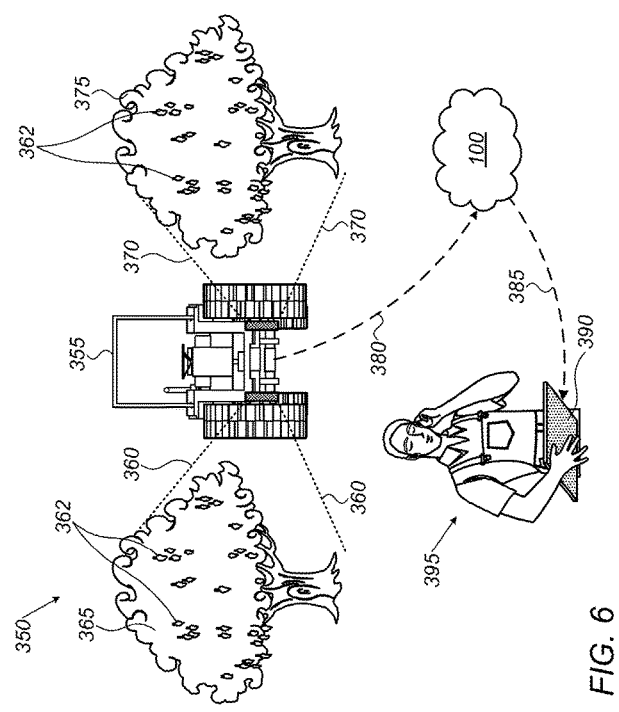

METHOD AND SYSTEM FOR CROP YIELD ESTIMATION

FIELD OF THE INVENTION

The present invention relates to crop yield estimation. More particularly, the present invention relates to methods and systems for identifying fruit in an image.

BACKGROUND OF THE INVENTION

Crop yield estimation may be used for determining investment costs and anticipated revenue in managing an orchard. Cost estimates for water expenditure, application and quantity of fertilizer to be applied to fruit trees, and manual labor costs needed for caring for the fruit trees from the growing season and until harvesting the ripe fruit from the fruit trees, for example, are based on fruit yield estimates. Any errors in fruit yield estimates may be very costly.

Methods based on human inspection to count a number of fruits on a tree may be time-consuming and inefficient. For example, determining a yield of fruit from a tree may be computed by defining an area of a fruit tree, for example, by using a metal frame and counting the fruits within the area defined by the metal frame. Counting the fruit in this manner in one or two trees in a hectare, for example, may be used to estimate the fruit yield in the orchard. Additionally, RGB photo snapshots of the trees may be taken and the fruits of each tree in the acquired photographs may be counted and the fruit count used to estimate fruit yield.

It is desirable to have a system and method for accurately and automatically counting fruit in fruit trees and mapping the number of fruit in the fruit trees over a geographical region, such as an orchard, for example.

SUMMARY OF THE INVENTION

There is thus provided, in accordance with some embodiments of the present invention, a method for identifying the presence of fruit in image data in an image sensor of a scene including acquiring image data in an image sensor for at least two distinct wavelengths of a scene. A normalized difference reflectivity index (NDRI) is calculated for each location in an array of locations in the image data with respect to said at least two distinct wavelengths. Regions in the array of locations are identified where the value of the calculated NDRI of the locations in these regions is within a range of values indicative of a presence of fruits in the scene. An output on an output device is generated with information related to the identified presence of fruits.

In accordance with some embodiments of the present invention, the scene includes a plant or a part of a plant.

In accordance with some embodiments of the present invention, the information includes an estimate of a number of fruits identified in the scene.

In accordance with some embodiments of the present invention, the scene includes a part of a plant, and estimating a number of fruits in the part of the plant includes using the information with the estimate of the number of fruits identified in the scene and applying a statistical model to estimate a number of hidden fruits not identified in the scene.

In accordance with some embodiments of the present invention, the method includes estimating a distribution of fruit sizes in the scene using a deep learning module.

In accordance with some embodiments of the present invention, the image sensor is mounted on a vehicle configured to move through the geographical region, and the method includes acquiring image data of a plurality of scenes of the geographical region with the image sensor.

In accordance with some embodiments of the present invention, the plurality of scenes includes a plurality of images of fruit trees in the geographical region, and the method includes using the information from the image data of the plurality of scenes so as to estimate a number of fruits in the fruit trees in the geographical region.

In accordance with some embodiments of the present invention, the method includes identifying locations of the fruit trees in the geographic region using global positioning system (GPS) data.

In accordance with some embodiments of the present invention, the method includes estimating a number of fruits in the identified regions which include an overlap between two or more fruits in a fruit cluster using a deep learning module.

In accordance with some embodiments of the present invention, the generated output with information related to the identified presence of fruits is stored in a storage device on a remote server.

There is further provided, in accordance with some embodiments of the present invention, a system for identifying the presence of fruit in image data of a scene comprising an image sensor and a processor. The image sensor is configured to acquire image data for at least two distinct wavelengths of a scene. The processor is configured to calculate a normalized difference reflectivity index (NDRI) for each location in an array of locations in the image data with respect to said at least two distinct wavelengths, to identify regions in the array of locations where the value of the calculated NDRI of the locations in these regions is within a range of values indicative of a presence of fruits in the scene, and to generate an output on an output device with information related to the identified presence of fruits.

In accordance with some embodiments of the present invention, the image sensor includes a beamsplitter configured to split light concurrently onto at least two arrays of light sensors in the image sensor, each of the at least two arrays sensitive to light at each of the at least two distinct wavelengths, so as to acquire image data of the scene at the at least two distinct wavelengths.

BRIEF DESCRIPTION OF THE DRAWINGS

In order for the present invention, to be better understood and for its practical applications to be appreciated, the following figures are provided and referenced hereafter. It should be noted that the figures are given as examples only and in no way limit the scope of the invention. Like components are denoted by like reference numerals.

FIG. 5 schematically illustrates a hand-held system for crop estimation, in accordance with some embodiments of the present invention;

FIG. 6 schematically illustrates a system for crop estimation cooperating with a remote device, in accordance with some embodiments of the present invention.

DETAILED DESCRIPTION OF THE INVENTION

Figure 1:
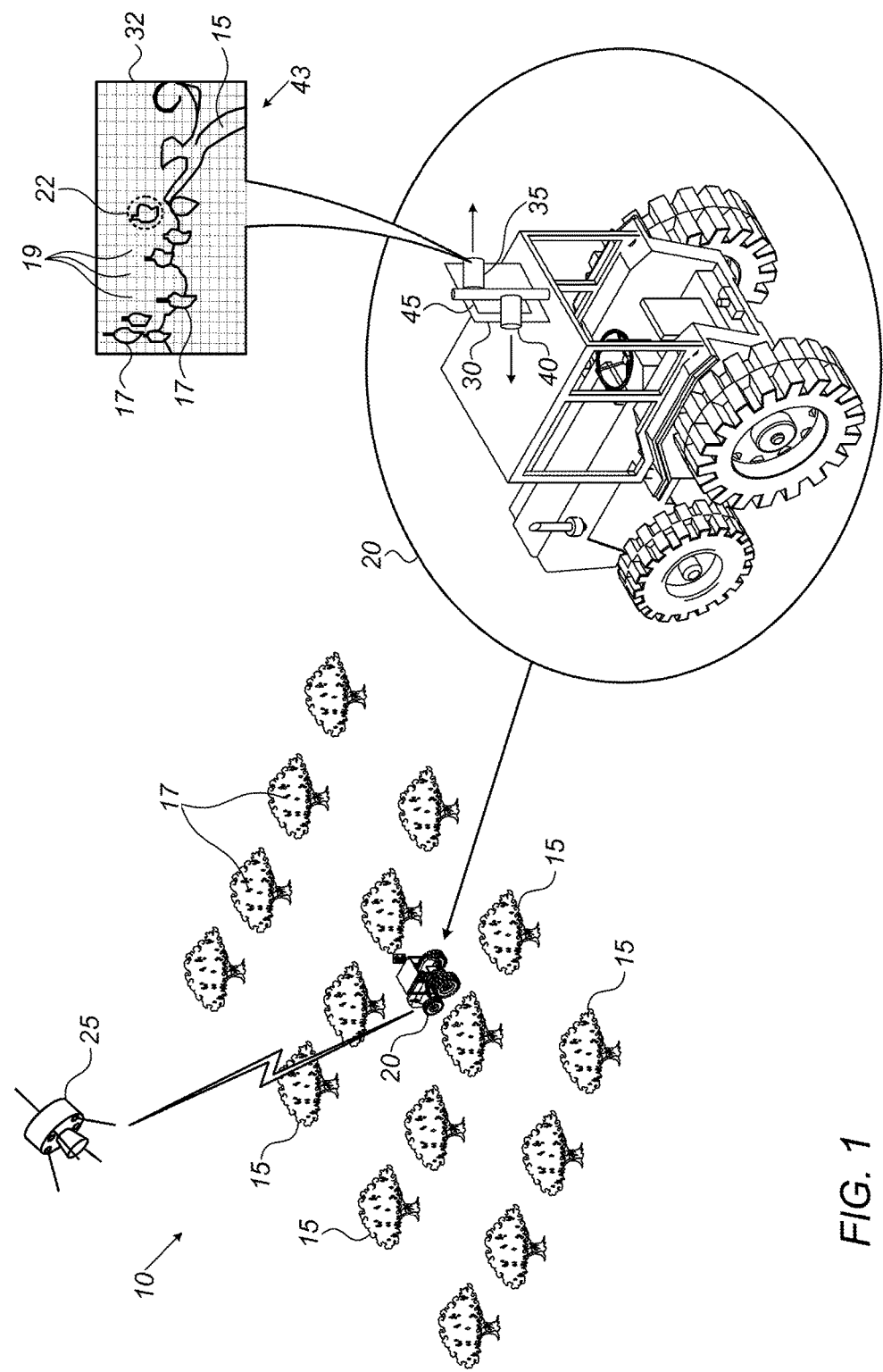
FIG. 1 schematically illustrates a system for crop estimation mounted on a tractor for scanning a geographical region of plants with fruit, in accordance with some embodiments of the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, us of the conjunction "or" as used herein is to be understood as inclusive (any or all of the stated options).

Some embodiments of the present invention herein describe methods and systems for crop estimation, such as estimating a number of fruits, and/or a fruit load, and/or a fruit yield from a crop of plants located within a geographical region from image data of a plurality of scenes acquired in an image sensor. The scene may include, for example, pictures of fruit trees, or parts of fruit trees, such as citrus fruit trees, planted in the geographical location, typically an orchard. The image sensors, typically a camera, for example, may be coupled to an image processing unit where the image data may be processed to identify fruits on a fruit tree in the captured image of the fruit tree in the scene, for example. Thus, image data of a plurality of scenes including fruit trees in the orchard may be used to estimate the number of fruits or fruit yield in the orchard using the methods and systems described herein below. Near infrared wavelengths may be used to distinguish between green fruits (e.g., before ripening) and green leaves.

FIG. 1 schematically illustrates a system for crop estimation 30 mounted on a tractor 20 for scanning a geographical region 10 of plants 15 with fruit 17, in accordance with some embodiments of the present invention. Geographical region 10 may include, for example, an orchard and/or a vineyard. Plants 15 may include fruit trees 15 with fruit 17. Fruit 17 on fruit trees 15 may include fruits, vegetables, and/or nuts, for example. Plants 15 may include all types of fruit trees, such as citrus fruit trees, decumbent plants, such as vines, and fruits of deciduous trees. Fruits growing on decumbent plants may include, for example, tomatoes and squash, as well as melons and watermelons. Fruit 17 may also include olives and sub-tropical fruits, such as avocado, mango, etc.

Images sensors 35 and 40, such as cameras for example, in system for crop estimation 30 may be coupled to an image processing unit (IPU) 45. System 30 may be mounted on a vehicle, such as tractor 20. Tractor 20 may move through orchard 10. A first camera 35 and a second camera 40 mounted on the front and/or back of tractor 20 may be used to acquire images of fruit trees 15, bushes, plants, etc. (hereinafter—"trees" for brevity) in orchard 10, grove, plot, field etc. (hereinafter—"orchard" for brevity) of all or a portion of the fruit trees in the orchard. In the embodiment shown in FIG. 1, as the tractor moves between two rows of trees 15 in a scanning session, first camera 35 may be oriented to acquire images of one row of fruit trees and second camera 40 the other row of trees 15, for example, in two opposite rows of trees.

Each camera may acquire image data of a scene 32 shown in an inset 43 of FIG. 1. Scene 32 may include all or part of fruit tree 15 with fruit 17 as shown in inset 43. The image data in scene 32 may be partitioned into an array of locations 19. The array of locations 19 may be characterized as having any suitable resolution, e.g., based on the image sensor specification. In some embodiments, each of locations 19 in the array may correspond to a single image pixel. In other embodiments, each of locations 19 in the array may correspond to a cluster of pixels. A region 22 may include multiple locations in the array of locations 19 where IPU 45 identifies a presence of fruits in the region.

Image processing unit 45 may be configured to estimate a number of fruit 17 in scene 32. First 35 and second 40 cameras may acquire a plurality of images of scenes 32 for all or a portion of fruit trees 15 in orchard 10. Image processing unit 45 may be configured to estimate a number of fruits from the plurality of images from the number of fruits visible in the image data using spectral remote sensing methods. Statistical processing may then be used to estimate a number of fruits on the tree not imaged in the plurality of fruit tree images in scenes 32. For example, the image data may include pictures of fruits across a surface of the tree. Leaves and fruits on the surface may block the view of fruits hidden behind the surface of scene 32. IPU 45 may estimate the number of fruits identified (e.g., visible) in the image data in scene 32 and apply statistical data (e.g., statistical modeling) to estimate the hidden fruit not identified in scene 32 so as to estimate the total number of fruits in scene 32.

In some embodiments, IPU 45 may concatenate and/or superimpose image data acquired in a plurality of scenes including parts of the same tree or a plurality of trees so as to obtain an estimate of the number of fruits visible in the image data of a single fruit tree or a group of trees. The estimate of the number of fruit on a fruit tree or a group of trees may include the number of fruit that were identified in the processed image data and an estimated addition of fruits based on a statistical analysis (e.g., extrapolation) to account for the hidden fruit on the fruit tree or trees not visible in the image data.

Image processing unit 45 may cooperate with a global positioning system (GPS) and inertial navigation system (INS) with a GPS/INS satellite 25, which may relay the position of the tractor and the image sensors in orchard 10 to IPU 45. The location or position the acquired image data for each scene of the plurality of fruit trees 15 may be computed from the relayed GPS/INS data when the image data is acquired using the position of the tractor relative to each of the fruit trees, for example, during the scanning session.

Using statistical models and the image data of scenes including a plurality of fruits trees in orchard 10, IPU 45 may estimate a number of fruits in the orchard and/or a fruit yield such as the number of fruits per a given area of the orchard (e.g., hectare), for example. Using the GPS data to locate positions of the fruit trees in the orchard, IPU 45 may be used to map the density of fruits in the fruit trees within geographical area, or orchard 10.

Figure 2:
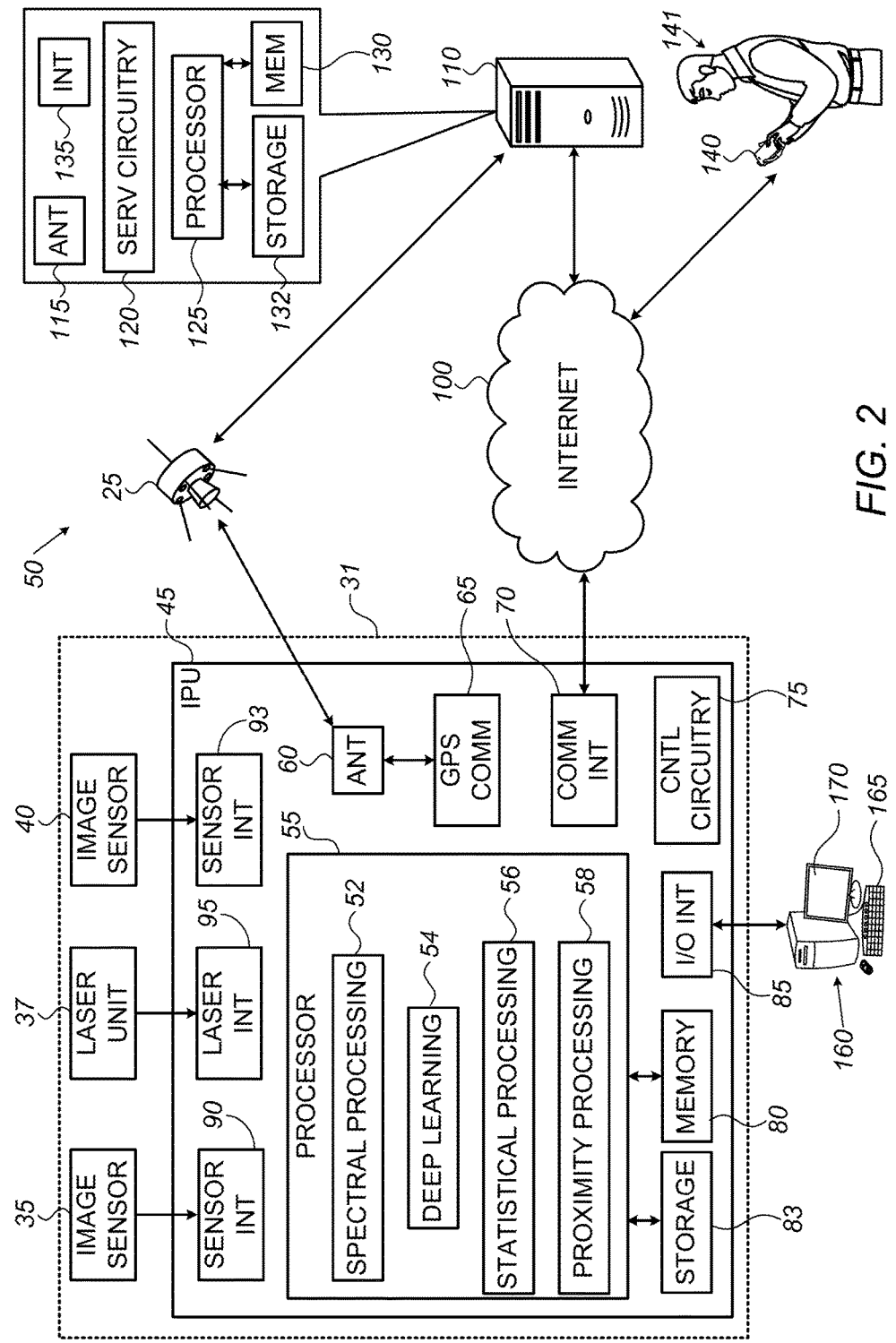
FIG. 2 schematically illustrates a system for crop estimation, in accordance with some embodiments of the present invention.

FIG. 2 schematically illustrates a system 50 for crop estimation, in accordance with some embodiments of the present invention. System 50 may include an imaging unit 31 which may communicate with a server 110 via the internet 100. Imaging unit 31 may include first image sensor 35, second image sensor 40 and a laser unit 37 which may be coupled to image processing unit (IPU) 45 via a first image sensor interface 90, a second image sensor interface 93 and a laser interface 95. Although the embodiments shown in FIGS. 1 and 2 illustrate two image sensors, any number of image sensors (e.g., at least one image sensor) may be used. Laser unit 37 may be used as a laser distance sensor to determine the distance between cameras (e.g., image sensors 35 and 40) mounted on vehicle 20 and trees 15 as shown in FIG. 1. IPU 45 may include a processor 55 coupled to a memory 80 and a storage device 83. Processor 55 may include one or more processing units, e.g. of one or more computers.

IPU 45 may include control circuitry 75, a communication interface 70 for communicating with a remote server 110 (e.g., used for cloud computing) via the internet 100 (e.g., over a TCP/IP connection), and a GPS/INS communication unit 65. GPS/INS communication unit 65 may be coupled to an antenna 60 and may be used to communicate with and receive location and position data of IPU 45 (e.g., fruit trees in the orchard) with a global positioning system (GPS) and an inertial navigation system (INS) using GPS/INS satellite 25.

Processor 55 may be configured to communicate with an input/output terminal 160 including an input device 165 and an output device 170 via an input/output interface 85. Input/output terminal 160 may include a computer.

Processor 55 may be configured to communicate with input device 165. For example, input device 165 may include one or more of a keyboard, keypad, or pointing device for enabling a user to inputting data or instructions for operation of processor 55.

For example, output device 170 may include a computer monitor or screen. Processor 55 may be configured to communicate with a screen of output device 170 to output information related to the identified presence of fruits in image data of scenes of plants, such as fruit trees, with fruit. In another example, output device 170 may include a printer, display panel, speaker, or another device capable of producing visible, audible, or tactile output.

Processor 55 may be configured to communicate with memory 80. Memory 80 may include one or more volatile or nonvolatile memory devices. Memory 80 may be utilized to store, for example, programmed instructions for operation of processor 55, data or parameters for use by processor 55 during operation, or results of operation of processor 55

Processor 55 may be configured to communicate with data storage device 83. Data storage device 83 may include one or more fixed or removable nonvolatile data storage devices. For example, data storage device 83 may include a computer readable medium for storing program instructions for operation of processor 55. In this example, the programmed instructions may take the form of image processing routines and/or instructions in a spectral processing module 52, a deep learning module 54, a statistical processing module 56, and a proximity processing module 58 for processing the image data of scenes in the image sensors. Data storage device 83 may be utilized to store data or parameters for use by processor 55 during operation, or results of operation of processor 55.

IPU 45 may be configured to communicate with remote server 110 over the internet 100 using a wired connection and/or by wireless communication by using any suitable wireless communication standard such Mobile Communications (GSM), General Packet Radio Service (GPRS), High Speed Packet Access (HSPA), Enhanced Data Rates for Global Evolution (EDGE), Long Term Evolution (LTE), Code Division Multiple Access (CDMA), Wireless Fidelity (WiFi), and/or Bluetooth.

In some embodiments of the present invention, imaging unit 31 may include all of the components and image processing features so as to compute the parameters for crop yield estimation in a stand-alone imaging unit 30 as shown in FIG. 1. For example after a scanning session, stand-alone imaging unit 30 may be connected to input/output terminal 160 to receive the crop estimation data and reports from the image data and/or GPS data collected during the scanning session of orchard 10, which may be stored in memory and/or storage 83. Alternatively and/or additionally, cloud computing may be used where imaging unit 31 acquires the image data of the scenes using first 35 and second 40 image sensors and relays the image data to remote server 110. Remote server 110 may use cloud computing to manage to the image data acquired from the images sensors and to estimate the number of fruit in the acquired images.

Remote server 110 may include server circuitry 120 and one or more processors 125, which may communicate with a server storage device 132 and a server memory 130. Server 110 may include a communication interface 135 for communicating with IPU 45 via the internet, for example Remote server 110 may include an antenna 115 to communicate with GPS/INS satellite 25 to receive the location of plants such as fruit tree 15 in geographical area 10.

Server storage device 132 may be used to store the acquired image data, processed image data, and the programming instructions used to implement the image data processing flow including spectral processing module 52, deep learning module 54, statistical processing module 56, and proximity processing model 58 in the form of an installation package or packages that can be downloaded and installed for execution by a server processor 125. Server storage device 132 may include a database such as for the acquired/processed image data and location data, for example.

In some embodiments of the present invention, memories 80 and 130 may include data storage devices 83 and 132, respectively, such as nonvolatile memory, or flash memory.

In some embodiments of the present invention, a user 141 of system 10 may receive information about the presence of fruit in the orchard via internet 100 in a communication device 140, such as a cellphone and/or handheld tablet, for example. Communication device 140 may communicate with remote server 110 and/or IPU 45 either directly with a wired connection and/or over the internet 100 using any suitable wireless communication standard such as Global System for Mobile Communications (GSM), General Packet Radio Service (GPRS), High Speed Packet Access (HSPA), Enhanced Data Rates for Global Evolution (EDGE), Long Term Evolution (LTE), Code Division Multiple Access (CDMA), Wireless Fidelity (WiFi), and/or Bluetooth. Communication device 140 may include an image sensor such as a camera for acquiring image data of the fruit trees in the orchard, for example.

Early seasonal citrus fruits may be the same color as the green leaves between the time of about one month after the citrus fruit trees flowers to just before the fruits ripen into a yellow and/or orange color, for example. It may be difficult to differentiate between the early green fruit and the green leaves at this stage of growth by use of fruit tree images acquired by image data using RGB cameras, for example.

In some embodiments of the present invention, spectral remote sensing methods using near infrared (NIR) wavelengths of the spectrum may be used to distinguish between the green fruits and the green leaves which may be used to estimate the number of fruits on the fruit trees. Light, such as sunlight or an artificial source of light, for example, impinging on the tree may reflect off different parts of the tree including the leaves and the fruit into the camera. The reflected light may be acquired as image data of scene including a fruit tree, or part of a fruit tree in the image sensor, such as a camera. Fruits and leaves may exhibit different spectral properties at certain NIR wavelengths.

The methods described herein to identify the presence of citrus fruits in the image data of a scene acquired by an image sensor are not by way of limitation of the embodiments of the present invention. Any fruits, vegetables and/or nuts may be identified using these methods, such as the fruits of deciduous trees, sub-tropical fruits (e.g., avocado, mango), olives, etc.

In some embodiments of the present invention, image sensors 35 and 40 may include a camera, such as a monochromatic camera. Such monochromatic cameras may include a plurality of photo-sites, or light sensors, arranged in a spatial array. Each light sensor may produce an electrical signal proportional to the light intensity or light power impinging on the active area of the light sensor for a given period of time (e.g., integration time). However, the monochromatic light sensors are typically sensitive to all visible and NIR wavelengths impinging on the active area of the light sensors. In some embodiments, filters may be used to differentiate between the at least two wavelengths.

In some embodiments of the present invention, at least two NIR filters with a passband frequencies corresponding to the at least two wavelengths may be mounted on a rotating wheel above the camera lens. Image data may be acquired, for example, as the rotating wheel rotates and places a filter with one passband wavelength above the lens to take image data at one passband frequency. Then a different filter with another passband frequency may be rotated into place above the lens to take image data of the same scene, and so forth. Image data for the at least two wavelengths may be used to differentiate between the green fruit and the green leaves.

In this case where each of the plurality of locations 19 in the array such as an X-Y array represents an image pixel, for example, each pixel may include a pixel value related to the illumination power captured by the respective light sensor at a given wavelength set by the filters. The pixel value may be related to the intensity of light reflected from the fruit tree at the given wavelength and acquired by the light sensor associated with the pixel. The reflectivity at the given wavelength at each pixel may be determined from the pixel value. In some embodiments, flat field corrections may be used to remove the electronic and photonic noise from the image data so as to obtain the reflectance at each pixel in the image data.

Each location (e.g., in this case, each pixel) in the array may be represented as a spectral cube with two spatial dimensions such as the X-Y dimensions, for example, and one spectral dimension, e.g., one of the at least two wavelengths. If three wavelengths are used, each pixel or spectral cube may be spatially defined with X-Y dimensions of the pixel and may include three spectral layers corresponding to the three wavelengths.

In some embodiments of the present invention, image sensors 35 and 40 may include a color camera. However, each light sensor in the camera may include multiple NIR filters such that each location 19 from the plurality of locations may include one or more pixels, where each pixel from the one or more pixels are sensitive to one wavelength from the at least two wavelengths as determined by the respective NIR filter.

In some embodiments of the present invention, image sensors 35 and 40, such as a camera, may include a beamsplitter configured to split light concurrently onto at least two arrays of light sensors in the image sensor, each of the at least two arrays sensitive to light at each of the at least two distinct wavelengths, so as to acquire image data of the scene for the at least two distinct wavelengths.

In some embodiments, two or more respective light beams generated by the beamsplitter may pass through internal filters in the image sensor with passband frequencies corresponding to the at least two distinct wavelengths for selectively filtering the light beams for exciting each of the at least two arrays of light sensors. In some embodiments, a wavelength selective beamsplitter, such as an optical prism or an optical grating, may be used to selectively split the light into at least two light beams at each of the at least two wavelengths for exciting each of the at least two arrays of light sensors. Additional filtering may also be applied to the light beams after the prism.

In some embodiments of the present invention, a camera enhanced to NIR spectral wavelengths (e.g., about 1100 nm) including three filters with respective passband responses at 810, 835, and 970 nm, for example, may be used to acquire image data of the scene with parts of the citrus tree and/or the entire citrus tree. The spatial resolution of the camera may be fixed in accordance with the target (e.g., citrus fruit) spatial requirements. For example, the size of the green citrus fruits at the beginning of the growing season may be 20 mm. For this case, the spatial resolution may be 2 mm, for example, to capture and differentiate between the fruit and leaves.

Figure 3:
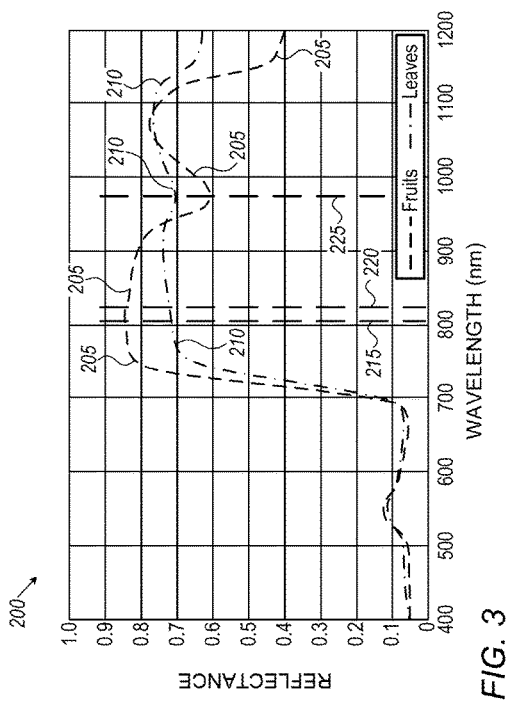
FIG. 3 schematically illustrates reflectivity data of citrus fruit and leaves as a function of wavelength, in accordance with some embodiments of the present invention.

FIG. 3 schematically illustrates reflectivity data 200 of citrus fruit 205 and leaves 210 as a function of wavelength, in accordance with some embodiments of the present invention. The reflectivity data shown in FIG. 3 was acquired using a portable spectrometer to analyze light reflected from the citrus fruit and green leaves of the citrus fruit tree, such as, for example, ASD FieldSpec Spectroradiometers, Analytic Spectral Devices (ASD), Inc., Boulder, Colo., U.S.A. The difference in reflectivity values may be used as a spectral 'fingerprint' to differentiate between fruit and leaves on the citrus fruits on the fruit tree in the acquired image data. In some embodiments, image sensors 35 and 40 may be used to acquire image data of scene 32 with an entire citrus fruit tree or a part thereof using three wavelengths of NIR light at 810, 835, and 970 nm.

A first marker 215 may intersect the reflectivity curves at 810 nm. A second marker 220 may intersect the reflectivity curves at 835 nm. A third marker 225 may intersect the reflectivity curves at 970 nm. For example, FIG. 3 illustrates that a fruit may have reflectivity values of 0.84 at 810 nm, 0.83 at 835 nm, and 0.61 at 970 nm. Note that, at 970 nm, the reflectivity for citrus fruit is about 20% lower than the reflectivity at 810 and 835 nm, and this characteristic may be used to identify citrus fruit in location 19. Similarly, leaves may have reflectivity values of 0.71 at 810 nm, 0.72 at 835 nm, and 0.70 at 970 nm. In some embodiments, citrus fruit reflectivity curve 205 may exhibit a full width half minimum (FWHM) of 30 nm at third marker 225 at 970 nm intersecting the minimum of citrus fruit reflectivity curve 205 as shown in FIG. 3.

In some embodiments, the image sensor, or monochromatic camera with three filters at 810, 835, and 970 nm may be used to acquire image data with the image pixel values at each of the three wavelengths at 810, 835, and 970 nm for each location 19, or pixel. The image pixel values at each of the three wavelengths at 810, 835, and 970 nm may be used to obtain the reflectivity at each of the three wavelengths at each pixel. Location 19 may include one pixel, or may include multiple pixels. Nevertheless, the reflectivity values at each location 19 may be determined and may be used as an indication of fruit at location 19 in the image data of scene 32.

In some embodiments of the present invention, a normalized difference reflectivity index (NDRI) for each location 19 in an array of locations in the image data may be calculated for pairs of wavelengths chosen from the at least two distinct wavelengths (e.g., 810, 830, and 970 nm, in this example). NDRI may be defined in equation (1) by $$\text{NDRI}(R_{\lambda,1}, R_{\lambda,2}) = (R_{\lambda,1} - R_{\lambda,2})/(R_{\lambda,1} + R_{\lambda,2}) \quad (1)$$

where $R_{\lambda,1}$ and $R_{\lambda,2}$ are the reflectivity values at $\lambda_1$ and $\lambda_2$, respectively.

In the case of citrus fruits as shown in FIG. 3, the NDRI value at each location 19 in scene 32 may be computed using the reflectivity data for citrus fruit and leaves from FIG. 3. NDRI (810 nm, 970 nm) may be on the order of 0.16 for fruit and 0.01 for leaves. Similarly, NDRI (835 nm, 970 nm) may be on the order of 0.15 for fruit and 0.01 for leaves. Although each value of NDRI (810 nm, 970 nm) and NDRI (835 nm, 970 nm) parameters alone may be used to determine whether fruit or leaves are present in location 19, both NDRI parameters may be used together to increase the probability of correctly identifying fruit in location 19.

In some embodiments of the present invention, the identifying regions, e.g., region 22 in the array of locations 19 where the value of the calculated NDRI for each location 19 is within a range of values that may be indicative of a presence of fruits in scene 32. The range of values indicative of the presence of fruits may be determined from the graph shown in FIG. 4. These ranges may then be used to distinguish between the target (e.g., green fruit) and the background (e.g., green foliage, such as the green leaves of the fruit tree) at each location 19 in the array.

Figure 4:
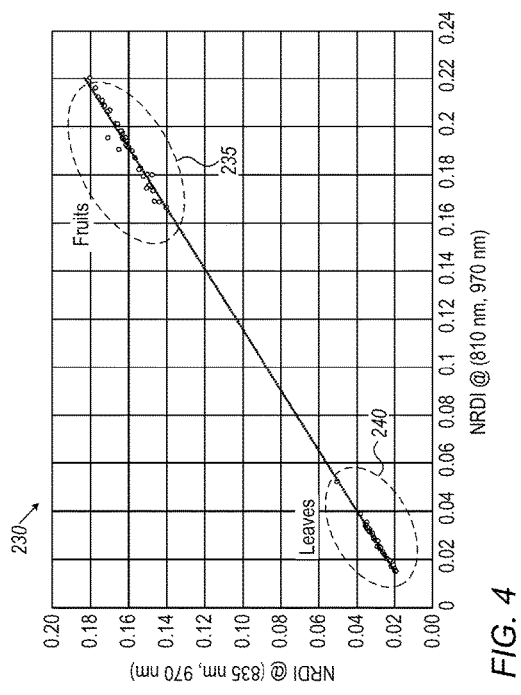
FIG. 4 is a graph of normalized difference reflectivity index (NDRI) values for distinguishing between fruits and leaves in acquired image data based on the reflectivity, in accordance with some embodiments of the present invention.

FIG. 4 is a graph 230 of normalized difference reflectivity index (NDRI) values for distinguishing between fruits 235 and leaves 240 in acquired image data based on the reflectivity, in accordance with some embodiments of the present invention. FIG. 4 shows NDRI values calculated for multiple samples of green citrus fruit and green leaves, denoted by the target (e.g., citrus fruits) and the background (e.g., leaves), which may be applied to the image data at each location 19. A plot of NDRI (835 nm, 970 nm) vs NDRI (810 nm, 970 nm) also known as the spectral band ratios as shown in FIG. 4 illustrates that a range of values where NDRI (810 nm, 970 nm) and NDRI (835 nm, 970 nm) are less than 0.06 may indicate that leaves have been imaged in scene 32. Similarly, a range of values where NDRI (810 nm, 970 nm) and NDRI (835 nm, 970 nm) are greater than 0.13 may indicate that fruits have been imaged in scene 32.

In some embodiments of the present invention, the inputs to IPU 45 may include the spectral images of scene 32 (e.g., the image data for the at least two wavelengths) acquired by image sensors 35 and 40. The spectral images may be processed by a spectral processing flow including spectral processing module 52 and deep learning module 54 as shown in FIG. 2, and a location analysis processing flow including statistical processing module 56 and proximity processing module 58. The spectral images may be locally processed by processor 55 in IPU 45, or by processor 125 in remote server 110.

In some embodiments of the present invention, image sensors 35 and 40 (e.g., monochromatic camera) may be configured to acquire the data which may include image pixel values indicative the radiance of light incident on the tree, such as sunlight or an artificial source of light, and reflected into the camera. The radiance, or radiative flux, detected by the sensors 35 and 40 may be used by IPU 45 and/or remote server 110 in compute NRDI values at each location 19.

In some embodiments of the present invention, spectral processing module 52 may use the image data acquired by the camera to determine the reflectance values at each pixel in the following manner. First, the digital number (DN), or pixel value, at each pixel from the light sensors in the camera are converted into energy values, or radiance values. Radiometric calibration information typically supplied by the camera manufacturer may be used to normalize the radiance values to reflectance values at each pixel. Spectral processing module 52 may be used to compute the normalized difference reflectivity index (NDRI) at each location 19 in the array of locations 19 in the image data.

The computed spectral band ratios (e.g., NDRI at different pairs of wavelengths) may then be used to distinguish between the fruit (e.g., target) and the leaves (e.g., background) in the scene. Spectral processing module 52 may apply image geometric corrections to the image data due to distortions that may occur in using a camera with a wide angle lens to image the fruit tree. The distance between the camera and the fruit tree may be determined using laser unit 37 and used to correct wide angle lens distortion.

In some embodiments of the present invention, deep learning module 54, or machine learning module, may be used to identify a number of fruits in scene 32 once fruits are indicated in location 19 from the NDRI value. For example, a citrus fruit may have a circular shape, but may be covered partially by leaves resulting in a detection of fruit in a variety of odd-shapes, or fruit fragments, in the array of image locations 19 in the image data. Additionally, a region 22 with indicated fruit may include an overlap between two or more fruits in a fruit cluster. Thus, deep learning module 54 may be used to estimate one or more fruits in the scene from a variety of shapes detected in locations 19 with fruit. In some embodiments, deep learning module 54 may be used to estimate a fruit size, for example, based on a curve in a detected fruit fragment. Deep learning module 54 may be also used to estimate a distribution of fruit sizes of fruits identified in the scene.

In some embodiments of the present invention, statistical processing module 56 may be used to estimate a number of fruits on the tree not captured the plurality of fruit tree images in scenes 32 as previously described. The image data may include pictures of fruits on the outer contour of the tree while leaves and fruits on the outer contour may block imaging fruits hidden behind the outer contour of scene 32. Statistical data from a variety of trees in different geographic locations, for example, may be used to construct models used by statistical processing module 56 to estimate a number of fruits on the tree not captured in the fruit tree images (e.g., behind the fruit and leaves on the outer contour of the fruit tree).

In some embodiments of the present invention, proximity processing module 58 may be used to obtain the exact location and position of each image acquired during an orchard scan, for example. Proximity processing module 58 may receive inputs from GPS/INS communication unit 65 as shown in FIG. 2. In some embodiments, the location and position data may be recorded during the acquisition of the image of each fruit tree (or part of a fruit tree) imaged during the scanning session. The location and position data may be used to calculate a fruit yield or fruit density per hectare, for example, as well as to map the density of fruits in the orchard upon estimating the number of fruits in the orchard.

In some embodiments of the present invention, the data from spectral processing flow and the location analysis processing flow may be used to generate a geo-database (GeoDB) that may be stored, for example, in cloud storage, such as server storage device 132 in remote server 110 based on the acquired and processed image data, and location data based on the geographical location of geographic region 10. The database may also include data taken over many years and/or cycles of planting and harvesting crops in the same and/or different geographical regions. For example, citrus fruits planted in Europe may have different crop yields than the same citrus fruits planted in Florida, for example. Output reports extracted from the GeoDB may be generated by system 50 in the form of a thematic map, written and/or tabular reports which may be sent to a user of the GeoDB.

FIG. 5 schematically illustrates a hand-held system 300 for crop estimation, in accordance with some embodiments of the present invention. A user 305, such as a farmer, may acquire image data of a fruit tree 315 with fruits 317 using a hand-held device 310 including an image sensor, such as a camera. Hand-held device 310 may be configured to send 320 the image data of fruit tree 315 over the internet 100 (e.g., by wireless, cellular or wired connection) to a remote cloud server 110 (e.g., in FIG. 2) which receives and processes the image data. User 305 may receive 325 an estimate of a number of fruits 317 on tree 315 on hand-held device 310 from the remote server in the cloud.

FIG. 6 schematically illustrates a system 350 for crop estimation cooperating with a remote device 390, in accordance with some embodiments of the present invention. A tractor 355 may acquire images of fruit trees 365 and fruit trees 375 in a scanning session covering all or a portion of the fruit trees in the orchard. A first camera 360 may be used to acquire image data of trees 365 with fruit 362 to the left side of tractor 355, for example, and a second camera 370 may be used to acquire image data of trees 375 with fruit 362 to the right side of tractor 355 as shown in FIG. 6. First camera 360 and second camera 370 may be configured to send 380 the image data over the internet 100 (e.g., by wireless, cellular or wired connection) to a remote cloud server 110 (e.g., in FIG. 2) which receives and processes the image data. Although the cameras are shown in FIG. 6 mounted on the rear of tractor 355, the cameras may be mounted in any suitable location on tractor 355, such as on top of the tractor frame, for example. A user 395 may receive 385 a report on remote communication device 390, such as a tablet, for example, with data about the number of fruits in the fruit tree in the orchard, as well as other relevant data such as location, mapping of the fruits in the orchard and fruit yield.

Figure 7:
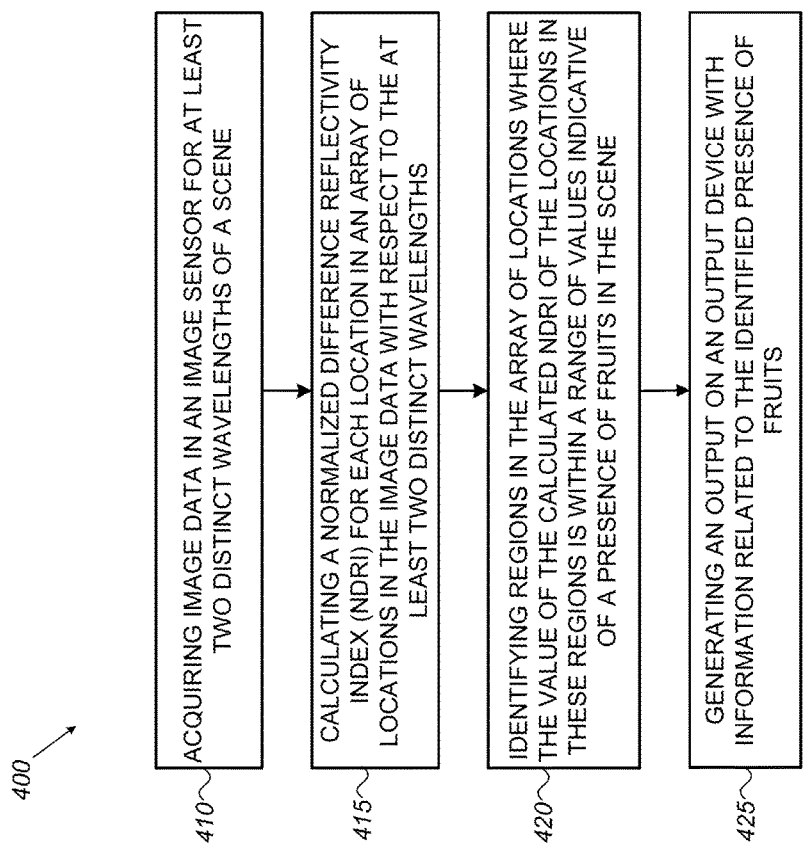
FIG. 7 is a flowchart depicting a method for crop estimation, in accordance with some embodiments of the present invention.

FIG. 7 is a flowchart depicting a method 400 for crop estimation, in accordance with some embodiments of the present invention. In the example of FIG. 7, method 400 may be executed by processor 55 of image processing unit 45 and/or in processor 55 of server 110. Method 400 may be executed upon a request or command that is issued by a user, or automatically issued by another application.

Method 400 may include acquiring 410 image data in an image sensor for at least two distinct wavelengths of a scene. Method 400 may include calculating 415 a normalized difference reflectivity index (NDRI) for each location in an array of locations in the image data with respect to the at least two distinct wavelengths. Method 400 may include identifying 420 regions in the array of locations where the value of the calculated NDRI of the locations in these regions is within a range of values indicative of a presence of fruits in the scene. Method 40 may include generating 425 an output on an output device with information related to the identified presence of fruits.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for identifying the presence of fruit in image data in an image sensor of a scene, the method comprising:
   acquiring image data in an image sensor for at least two distinct wavelengths of a scene;
   calculating a normalized difference reflectivity index (NDRI) for each location in an array of locations in the image data with respect to said at least two distinct wavelengths;
   identifying regions in the array of locations where the value of the calculated NDRI of the locations in these regions is within a range of values indicative of a presence of fruits in the scene; and
   generating an output on an output device with information related to the identified presence of fruits;
   wherein the information comprises an estimate of a number of fruits identified in the scene and the scene comprises a part of a plant, and
   wherein estimating a number of fruits in the part of the plant comprises using the estimate of the number of fruits identified in the scene and applying a statistical model to estimate a number of hidden fruits not identified in the scene.

2. The method according to claim 1, wherein the scene comprises a plant or a part of a plant.

3. The method according to claim 1, further comprising estimating a distribution of fruit sizes in the scene using a deep learning module.

4. The method according to claim 1, wherein the image sensor is mounted on a vehicle configured to move through the geographical region, and further comprising acquiring image data of a plurality of scenes of the geographical region with the image sensor.

5. The method according to claim 4, wherein the plurality of scenes comprises a plurality of images of fruit trees in the geographical region, and further comprising using the information from the image data of the plurality of scenes so as to estimate a number of fruits in the fruit trees in the geographical region.

6. The method according to claim 5, further comprising identifying locations of the fruit trees in the geographical region using global positioning system (GPS) data.

7. The method according to claim 1, further comprising estimating a number of fruits in the identified regions which include an overlap between two or more fruits in a fruit cluster using a deep learning module.

8. The method according to claim 1, wherein the generated output with information related to the identified presence of fruits is stored in a storage device on a remote server.

9. A system for identifying the presence of fruit in image data of a scene, the system comprising:
   an image sensor configured to acquire image data for at least two distinct wavelengths of a scene; and
   a processor configured to calculate a normalized difference reflectivity index (NDRI) for each location in an array of locations in the image data with respect to said at least two distinct wavelengths, to identify regions in the array of locations where the value of the calculated NDRI of the locations in these regions is within a range of values indicative of a presence of fruits in the scene, and to generate an output on an output device with information related to the identified presence of fruits;
   wherein the information comprises an estimate of a number of fruits identified in the scene, and wherein the scene comprises a part of a plant, and wherein the processor is configured to estimate a number of fruits in the part of the plant by using the estimate of the number of fruits identified in the scene and applying a statistical model to estimate of number of hidden fruits not identified in the scene using a statistical processing model.

10. The system according to claim 9, wherein the scene comprises a plant or a part of a plant.

11. The system according to claim 9, wherein the image sensor comprises a beam splitter configured to split light concurrently onto at least two arrays of light sensors in the image sensor, each of the at least two arrays sensitive to light at each of the at least two distinct wavelengths, so as to acquire image data of the scene at the at least two distinct wavelengths.

12. The system according to claim 9, wherein the image sensor comprises at least two bandpass filters with passband frequencies corresponding to the at least two distinct wavelengths.

13. The system according to claim 9, further comprising a vehicle configured to move through a geographical region with the image sensor mounted on the vehicle, and wherein the image sensor is configured to acquire image data of a plurality of scenes of the geographical region.

14. The system according to claim 13, wherein plurality of scenes comprises a plurality of images of fruit trees in the geographical region and wherein the processor is configured to use the information from the image data of the plurality of scenes so as to estimate a number of fruits in the fruit trees in the geographical region.

15. The system according to claim 14, further comprising a global positioning system (GPS) unit communication unit, and wherein the processor is configured to identify locations of fruit trees in the geographical region using GPS data.

16. The system according to claim 9, wherein the processor is configured to estimate a number of fruits in the identified regions which include an overlap between two or more fruits in a fruit cluster using a deep learning module.

17. The system according to claim 9, wherein the generated output with information related to the identified presence of fruits is stored in a storage device on a remote server.

18. The system according to claim 9, further comprising a database for storing the output with the information related to the identified presence of fruits.

19. A system for identifying the presence of fruit in image data of a scene, the system comprising:
   an image sensor configured to acquire image data for at least two distinct wavelengths of a scene; and
   a processor configured to calculate a normalized difference reflectivity index (NDRI) for each location in an array of locations in the image data with respect to said at least two distinct wavelengths, to identify regions in the array of locations where the value of the calculated NDRI of the locations in these regions is within a range of values indicative of a presence of fruits in the scene, and to generate an output on an output device with information related to the identified presence of fruits,
   wherein the processor is configured to estimate a number of fruits in the identified regions which include an overlap between two or more fruits in a fruit cluster using a deep learning module.

* * * * *